United States Patent
Schwie et al.

(10) Patent No.: US 10,611,499 B2
(45) Date of Patent: Apr. 7, 2020

(54) TOTAL AIR TEMPERATURE SENSORS

(71) Applicant: Rosemount Aerospace Inc., Burnsville, MN (US)

(72) Inventors: Chester Schwie, Burnsville, MN (US); Kyle Corniea, Burnsville, MN (US); Erik Jewett, Bloomington, MN (US); Grant Martin, Pooler, GA (US)

(73) Assignee: Rosemount Aerospace Inc., Burnsville, MN (US)

( * ) Notice: Subject to any disclaimer, the term of this patent is extended or adjusted under 35 U.S.C. 154(b) by 3 days.

(21) Appl. No.: 15/969,065

(22) Filed: May 2, 2018

(65) Prior Publication Data
US 2018/0244403 A1    Aug. 30, 2018

Related U.S. Application Data

(62) Division of application No. 14/186,156, filed on Feb. 21, 2014, now Pat. No. 9,981,756.

(60) Provisional application No. 61/891,200, filed on Oct. 15, 2013.

(51) Int. Cl.
 B64F 1/26    (2006.01)
 G01K 13/02    (2006.01)

(52) U.S. Cl.
 CPC .............. *B64F 1/26* (2013.01); *G01K 13/028* (2013.01)

(58) Field of Classification Search
 None
 See application file for complete search history.

(56) References Cited

U.S. PATENT DOCUMENTS

| | | | |
|---|---|---|---|
| 3,512,414 A | 5/1970 | Rees | |
| 2004/0146395 A1* | 7/2004 | Uselton | F04D 29/703 415/119 |
| 2006/0056489 A1 | 3/2006 | Bernard et al. | |
| 2009/0154522 A1* | 6/2009 | Kulczyk | G01K 13/02 374/138 |
| 2010/0039336 A1 | 2/2010 | Yasin et al. | |

(Continued)

FOREIGN PATENT DOCUMENTS

| | | |
|---|---|---|
| CN | 1442609 A | 9/2003 |
| CN | 1662796 A | 8/2005 |

(Continued)

OTHER PUBLICATIONS

Harris, et al., eds., "Harris' Shock and Vibration Handbook", 5th Edition, Chapter 29, 68 pages.

(Continued)

*Primary Examiner* — Erica S Lin
(74) *Attorney, Agent, or Firm* — Locke Lord LLP; Scott D. Wofsy; Joshua L. Jones

(57) ABSTRACT

A total air temperature sensor includes a probe head, a strut, and a turbulence inducing surface. The probe head has an airflow inlet and an airflow outlet. The strut defines a leading edge and an opposed trailing edge extending along a longitudinal axis, and connects between the probe head and an opposed probe mount. The turbulence inducing surface is defined in the strut aft the leading edge. The turbulence inducing surface is configured to trip a fluid boundary layer passing over the strut to transition from laminar to turbulent for moving flow separation toward the trailing edge to reduce acoustic noise emission from the total air temperature sensor.

7 Claims, 3 Drawing Sheets

(56) References Cited

U.S. PATENT DOCUMENTS

2011/0262705 A1 10/2011 Gupta et al.
2011/0318189 A1* 12/2011 Teraoka .................. F04D 17/04
　　　　　　　　　　　　　　　　　　　　　　　　416/228

FOREIGN PATENT DOCUMENTS

CN　　　201461226 U　　5/2010
CN　　　102733859 A　　10/2012
EP　　　　1457765 A1　　9/2004

OTHER PUBLICATIONS

C. A. Doolittle et al., U.S. Appl. No. 14/183,665, "Air Data Probes", filed Feb. 19, 2014.
Extended European Search Report dated Mar. 27, 2015, issued during the prosecution of corresponding European Patent Application No. 14189054.1 (8 pages).
Extended European Search Report dated Sep. 21, 2016, issued during the prosecution of corresponding European Patent Application No. 16180210.3 (9 pages).
Chinese Office Action and English translation dated Aug. 21, 2017 issued during the prosecution of Chinese Patent Application No. 201410539799.1.

\* cited by examiner

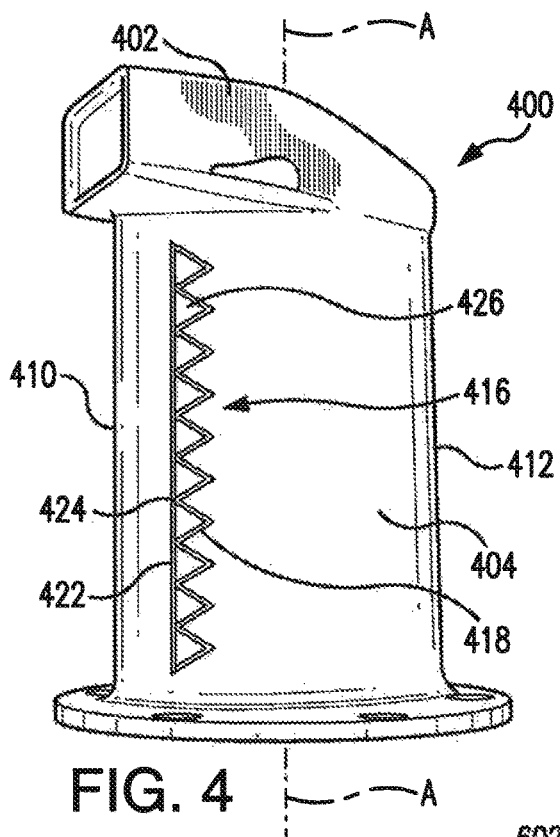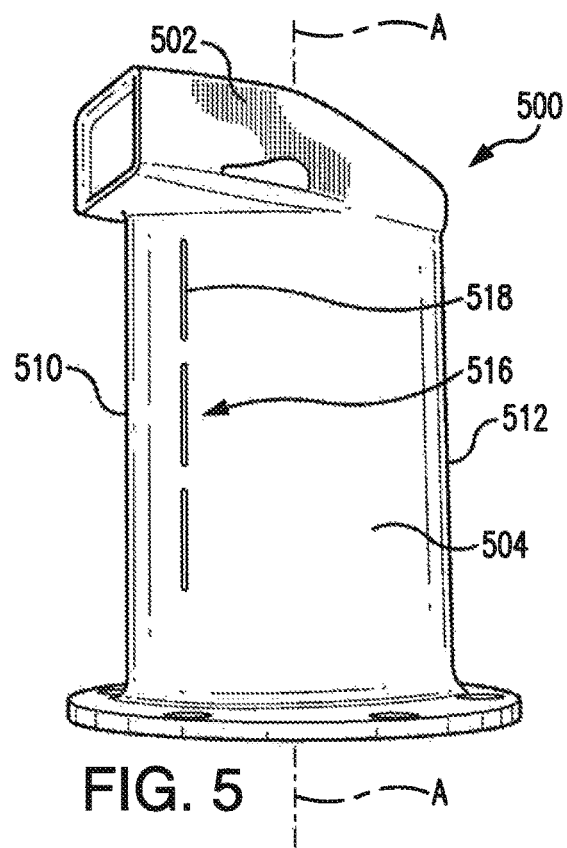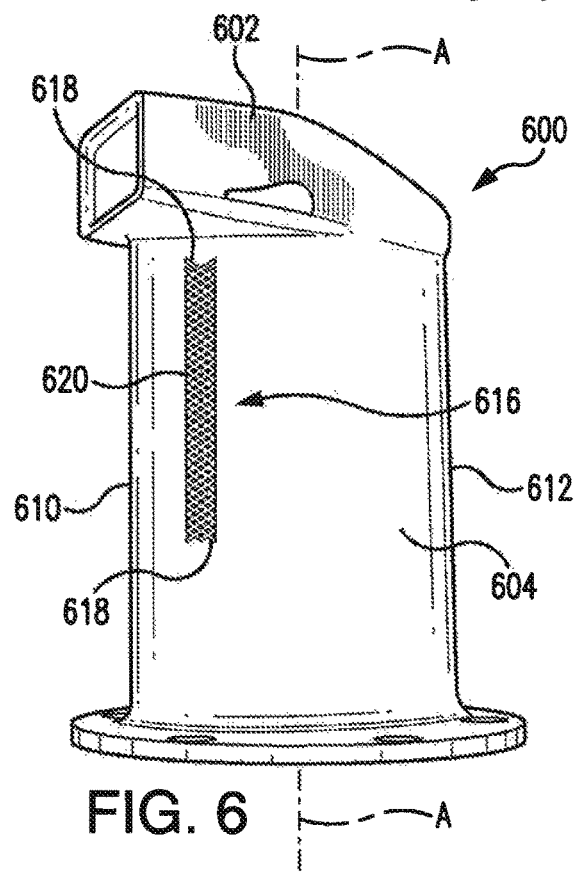

TOTAL AIR TEMPERATURE SENSORS

CROSS-REFERENCE TO RELATED APPLICATIONS

This application is a divisional of U.S. patent application Ser. No. 14/186,156 filed Feb. 21, 2014 which claims priority to U.S. Provisional Patent Application No. 61/891,200 filed Oct. 15, 2013, each of which is incorporated by reference herein in its entirety.

BACKGROUND OF THE INVENTION

1. Field of the Invention

The present disclosure relates to temperature sensors, and more particularly to total air temperature sensors, such as used in aerospace applications.

2. Description of Related Art

Modern jet powered aircraft require very accurate measurement of outside air temperature for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or (TS), (2) total air temperature (TAT) or (Tt), (3) recovery temperature (Tr), and (4) measured temperature (Tm). Static air temperature (SAT) or (TS) is the temperature of the undisturbed air through which the aircraft is about to fly. Total air temperature (TAT) or (Tt) is the maximum air temperature that can be attained by 100% conversion of the kinetic energy of the flow. The measurement of TAT is derived from the recovery temperature (Tr), which is the adiabatic value of local air temperature on each portion of the aircraft surface due to incomplete recovery of the kinetic energy. Recovery temperature (Tr) is obtained from the measured temperature (Tm), which is the actual temperature as measured, and which can differ from recovery temperature because of heat transfer effects due to imposed environments.

One ongoing challenge for total air temperature sensors is associated with acoustic noise emission. The aeroelastic developed air disturbance has been termed howl, squeal, roar, and whistle and has been reported to reach a sound pressure level of 82 dBA within the cockpit from fuselage probes. In fluid flows developing a Reynolds number above approximately 50, Kármán vortex streets develop and vortices shed from alternating sides of blunt airfoil trailing edges or bluff bodies. Kármán vortices develop cyclic forces that are mainly perpendicular to the airflow and cause aeroelastic vortex induced vibration. Aeroelastic vortex induced vibration sound generation can effect TAT sensors or any airfoil. Vortex induced vibration may also cause structural failure.

Such conventional methods and systems have generally been considered satisfactory for their intended purpose. However, there is still a need in the art for systems and methods that allow for improved total air temperature sensor performance, including reduced acoustic emissions. The present disclosure provides a solution for these problems.

SUMMARY OF THE INVENTION

A total air temperature sensor includes a probe head, a strut, and a turbulence inducing surface. The probe head has an airflow inlet and an airflow outlet. The strut defines a leading edge and an opposed trailing edge extending along a longitudinal axis, and connects between the probe head and an opposed probe mount. The turbulence inducing surface is defined in the strut aft the leading edge. The turbulence inducing surface is configured to trip a fluid boundary layer passing over the strut to transition from laminar to turbulent for moving flow separation toward the trailing edge to reduce acoustic noise emission from the total air temperature sensor.

The turbulence inducing surface can be defined as a strip along a surface of the strut in an axial direction with respect to the longitudinal axis of the strut. Further, the turbulence inducing surface can include a portion defined in a first surface of the strut and a portion defined in a second surface of the strut, the second surface opposed to the first surface. The portion of the turbulence inducing surface defined in the first surface can be defined as a first strip in an axial direction with respect to the longitudinal axis of the strut, and the portion of the turbulence inducing surface defined in the second surface can be defined as a second strip, wherein the second strip opposes the first strip. Further, the turbulence inducing surface can be defined more proximate to the leading edge than to the trailing edge. The turbulence inducing surface can be configured to reduce Kármán vortex interaction. In addition, the turbulence inducing surface can include features, such as, a plurality of circular channels, a plurality of linear serrations, a plurality of dimples, a flange, and/or a linear channel.

In certain embodiments, a total air temperature sensor includes a probe head and a strut, much as described above, and a serrated surface defined in the strut aft the leading edge configured to trip a fluid boundary layer passing over the strut to transition from laminar to turbulent for moving flow separation toward the trailing edge to reduce acoustic noise emission from the total air temperature sensor. The serrated surface includes a series of connecting serrations at opposing angles, wherein the serrations have a generally constant geometry repeated through the series.

The serrated surface can include a linear channel connecting the apexes of the series of connecting serrations to define a series of triangles. The serrated surface can include a second series of serrations parallel to the linear channel. Each second series serration can cut through a respective triangle from the series of triangles. The serrated surface can include a third series of serrations parallel to the linear channel, each third series serration can cut through a respective triangle from the series of triangles at a different location than the second series serrations. In addition, the serrated surface can be configured to reduce Kármán vortex interaction. Further, the serrated surface can include a portion defined in a first surface of the strut and a portion defined in the second surface of the strut, as described above with respect to the turbulence inducing surface. Also, the serrated surface can be defined more proximate to the leading edge than to the trailing edge.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a perspective view of another exemplary embodiment of a total air temperature sensor constructed in accordance with the present disclosure, showing a turbulence inducing surface as a serrated surface, where the serrated surface includes linear serrations at opposing angels and a linear channel connecting the apexes of the linear serrations;

FIG. 5 is a perspective view of another exemplary embodiment of a total air temperature sensor constructed in accordance with the present disclosure, showing the turbulence inducing surface including a plurality of linear channels;

FIG. 6 is a perspective view of another exemplary embodiment of a total air temperature sensor constructed in accordance with the present disclosure, showing the turbulence inducing surface as a serrated surface, where the serrated surface includes overlapping linear serrations at opposing angles;

DETAILED DESCRIPTION OF THE PREFERRED EMBODIMENTS

Figure 1:
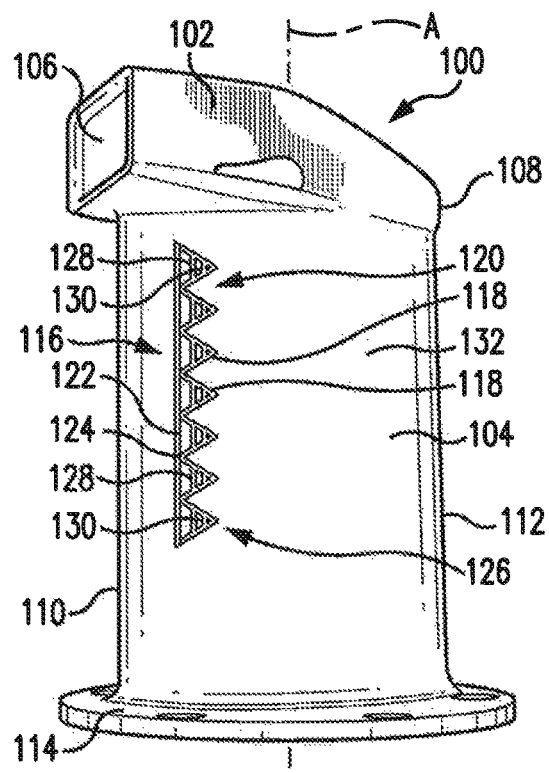
FIG. 1 is a perspective view of an exemplary embodiment of a total air temperature sensor constructed in accordance with the present disclosure, showing the turbulence inducing surface as a serrated surface.

Reference will now be made to the drawings wherein like reference numerals identify similar structural features or aspects of the subject disclosure. For purposes of explanation and illustration, and not limitation, a partial view of an exemplary embodiment of a total air temperature sensor in accordance with the disclosure is shown in FIG. 1 and is designated generally by reference character 100. Other embodiments of total air temperature sensors in accordance with the disclosure, or aspects thereof, are provided in FIGS. 2-10, as will be described. The systems and methods described herein can be used to reduce acoustic noise emission from total air temperature (TAT) probes and other airfoils.

As shown in FIG. 1, a total air temperature sensor 100 includes a probe head 102 and a strut 104. Probe head 102 has an airflow inlet 106 and an airflow outlet 108. The strut defines a leading edge 110 and an opposed trailing edge 112 extending along a longitudinal axis A, and connects between probe head 102 and an opposed probe mount 114. A serrated surface 116, e.g. a type of turbulence inducing surface, is defined in strut 104 aft leading edge 110. Serrated surface 116 is configured to trip a fluid boundary layer passing over strut 104 to transition from laminar to turbulent for moving flow separation toward trailing edge 112, e.g. relative to when the flow separation would otherwise occur, to reduce acoustic noise emission from total air temperature sensor 100. Serrated surface 116 includes a series 120 of connecting serrations 118 at opposing angles, wherein serrations 118 have a generally constant geometry repeated through series 120. There is a linear channel 122 connecting the apexes 124 of series 120 of connecting serrations 118 to define a series of triangles 126. Serrated surface 116 includes a second series 128 of serrations 118 parallel to linear channel 122, each second series 128 serration 118 cutting through a respective triangle from the series of triangles 126. Serrated surface 116 includes a third series 130 of serrations 118 parallel to linear channel 122, each third series 130 serration 118 cutting through a respective triangle from series of triangles 126 at a different location than second series 128 serrations 118. Serrated surface 116 is configured to reduce Kármán vortex interaction. While serrated surface 116 is shown in FIG. 1 with two serrations, second and third series serrations, 128 and 130, respectively, cutting through the triangles from series of triangles 126, those skilled in the art will readily appreciate that the number of serrations cutting through a respective triangle can vary, e.g. there could be a fourth series serration cutting through a respective triangle in addition to second series 128 and third series 130.

Those skilled in the art will readily appreciate that while serrated surface 116 is shown to include a portion defined in a first surface 132 of the strut, a portion can also be defined in the second surface, not shown, of the strut, the second surface opposed to first surface 132. Further, those skilled in the art will readily appreciate that the portion of serrated surface 116 defined in first surface 132 can be defined as a first strip, e.g. a strip of triangles 126, and the portion of serrated surface 116 defined in the second surface can be defined as a second strip, e.g. a second strip of triangles 126, wherein the second strip opposes the first strip. In other words, you can have a portion of the serrated surface on either side, or just one side, of the strut 104. Also, while serrated surface 116 is defined more proximate to leading edge 110 than to trailing edge 112, those skilled in the art will readily appreciate that serrated surface 116 can be defined in a different location or at a different orientation along strut 104. In addition, while serrated surface 116 is shown as having a depth with respect to strut 104, those skilled in the art will readily appreciate that serrated surface 116 and its included features, e.g. triangles 126, can also be raised with respect to strut 104.

With reference now to FIG. 2-10, total air temperature sensors 200, 300, 400, 500, 600, 700, 800, 900 and 1000 include respective probe heads, struts, and turbulence inducing surfaces. The probe heads and struts on total air temperature sensors 200, 300, 400, 500, 600, 700, 800, 900 and 1000 are similar probe head 102 and strut 104 as described above. Those skilled in the art will readily appreciate that the turbulence inducing surface of each total air temperature sensors 200, 300, 400, 500, 600, 700, 800, 900 and 1000 can include and combine a variety of features, such as, a plurality of circular channels, a plurality of linear serrations in various arrangements, a plurality of dimples, a flange, and/or a linear channel.

In continued reference to FIG. 2-10, turbulence inducing surfaces 216, 316, 416, 516, 616, 716, 816, 916 and 1016 are configured to trip a fluid boundary layer resulting in less acoustic noise emission, much as described above with respect to serrated surface 116. Turbulence inducing surfaces 216, 316, 416, 516, 616, 716, 816, 916 and 1016 are also configured to reduce Kármán vortex interaction, similar to the serrated surface 116 described above. Further, those skilled in the art will readily appreciate that turbulence inducing surfaces 216, 316, 416, 516, 616, 716, 816, 916 and 1016 are configured to include portions on a first surface of the strut, similar to first surface 132 of total air temperature sensor 100, and a portion defined in a second surface of the strut, not shown in the figures, the second surface opposed to the first surface. In other words, the turbulence inducing surface, e.g. 216, can be on both sides of the strut, e.g. 204.

Figure 2:
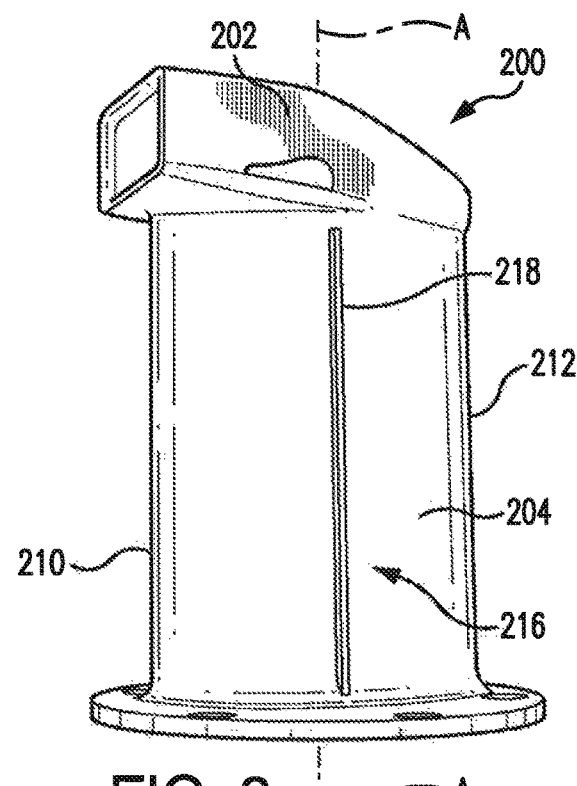
FIG. 2 is a perspective view of another exemplary embodiment of a total air temperature sensor constructed in accordance with the present disclosure, showing a turbulence inducing surface including a linear flange.

As shown in FIG. 2, total air temperature sensor 200 includes a turbulence inducing surface 216 defined in a strut 204 aft a leading edge 210. Turbulence inducing surface 216 includes a linear flange 218. While turbulence inducing surface 216 is defined approximately between the leading edge 210 and a trailing edge 212, those skilled in the art will readily appreciate that flange 218, can be moved as is suitable for a given application.

Figure 3:
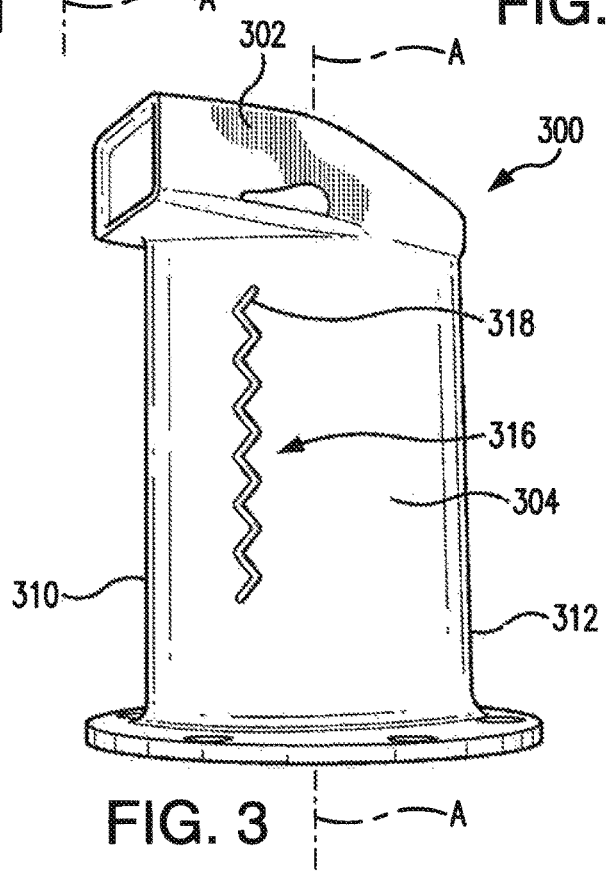
FIG. 3 is a perspective view of another exemplary embodiment of a total air temperature sensor constructed in accordance with the present disclosure, showing a turbulence inducing surface as a serrated surface, where the serrated surface includes linear serrations at opposing angels.

As shown in FIG. 3, total air temperature sensor 300 includes a turbulence inducing surface 316 defined in a strut 304 aft a leading edge 310. Turbulence inducing surface 316, e.g. a serrated surface, includes a series of linear serrations 318 arranged in a strip. The linear serrations 318 connect at opposing angles and have a generally constant geometry repeated through the series. While turbulence inducing surface 316 is defined more proximate to the leading edge 310 than to a trailing edge 312, those skilled in the art will readily appreciate that turbulence inducing surface 316, can be moved and oriented as is suitable for a given application. Further, those skilled in the art will readily appreciate that while linear serrations 318 are shown arranged in a strip, there could be spaces in between linear serrations 318, for example, there could be a first pair of linear serrations, e.g. linear serrations 318, connecting at opposing angles, a space, and then a second pair of linear serrations connecting at opposing angles aligned with the first. In addition, while linear serrations 316 are shown as having a depth with respect to strut 304, those skilled in the art will readily appreciate that linear serrations 316 can also be raised with respect to strut 304.

As shown in FIG. 4, total air temperature sensor 400 includes a turbulence inducing surface 416 defined in a strut 404 aft a leading edge 410. Turbulence inducing surface 416, e.g. a serrated surface, includes a series of connecting serrations 418 at opposing angles, wherein serrations 418 have a generally constant geometry repeated in a series. There is a linear channel 422 connecting apexes 424 of connecting serrations 418 to define a series of triangles 426. While turbulence inducing surface 416 is defined more proximate to the leading edge 410 than to a trailing edge 412, those skilled in the art will readily appreciate that turbulence inducing surface 416, can be moved and oriented as is suitable for a given application. In addition, while turbulence inducing surface 416 is shown as having a depth with respect to strut 404, those skilled in the art will readily appreciate that turbulence inducing surface 416, including series of connecting serrations 418 and linear channel 422, can be raised with respect to strut 404, for example, connecting serrations 418 can be raised with respect to strut 404 and instead of linear channel 422 connecting apexes 424, there would be a linear flange, similar to linear flange 218.

Further, those skilled in the art will readily appreciate that turbulence inducing surfaces, e.g. turbulence inducing surfaces 416 and 316, can be combined onto a single strut, e.g. strut 404. For example, it is contemplated that a first turbulence inducing surface, e.g. turbulence inducing surface 416, can be defined more proximate to a leading edge, e.g. leading edge 410, than to a trailing edge, e.g. trailing edge 412, and another turbulence inducing surface, e.g. turbulence inducing surface 316, can be defined in the same strut aft of the first turbulence inducing surface.

As shown in FIG. 5, total air temperature sensor 500 includes a turbulence inducing surface 516 defined in a strut 504 aft a leading edge 510. Turbulence inducing surface 516 includes a plurality of linear channels 518. While turbulence inducing surface 516 is defined more proximate to the leading edge 510 than to a trailing edge 512, those skilled in the art will readily appreciate that turbulence inducing surface 516, can be moved and oriented as is suitable for a given application. In addition, while turbulence inducing surface 516 is shown as having a depth with respect to strut 504, those skilled in the art will readily appreciate that turbulence inducing surface 516, including linear channels 518, can be raised with respect to strut 504, for example, linear channels 518 can be raised in a manner similar to linear flange 218.

As shown in FIG. 6, total air temperature sensor 600 includes a turbulence inducing surface 616 defined in a strut 604 aft a leading edge 610. Turbulence inducing surface 616, e.g. serrated surface, includes a plurality of connecting serrations 618 at opposing angles, wherein serrations 618 have a generally constant geometry. Connecting serrations 618 define a strip of cross-hatching 620. While turbulence inducing surface 616 is defined more proximate to the leading edge 610 than to a trailing edge 612, those skilled in the art will readily appreciate that turbulence inducing surface 616, can be moved and oriented as is suitable for a given application In addition, while turbulence inducing surface 616 is shown as having a depth with respect to strut 604, those skilled in the art will readily appreciate that turbulence inducing surface 616, including plurality of connecting serrations 618, can be raised with respect to strut 604.

Figure 7:
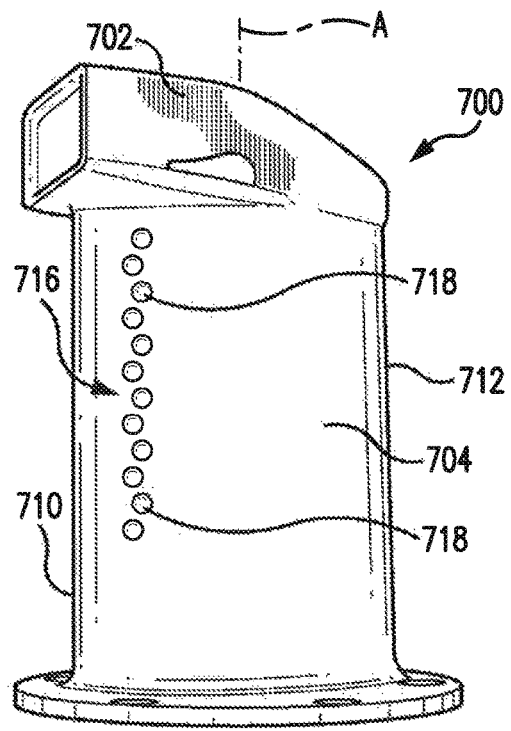
FIG. 7 is a perspective view of another exemplary embodiment of a total air temperature sensor constructed in accordance with the present disclosure, showing the turbulence inducing surface including a plurality of dimples.

As shown in FIG. 7, total air temperature sensor 700 includes a turbulence inducing surface 716 defined in a strut 704 aft a leading edge 710. Turbulence inducing surface 716 includes a plurality of dimples 718. While turbulence inducing surface 716 is defined more proximate to the leading edge 710 than to a trailing edge 712, those skilled in the art will readily appreciate that turbulence inducing surface 716, can be moved and oriented as is suitable for a given application. In addition, while turbulence inducing surface 716 is shown as having a depth with respect to strut 704, those skilled in the art will readily appreciate that turbulence inducing surface 716, including plurality of dimples 718, can be raised with respect to strut 704, i.e. as partial spherical outcroppings or bumps.

Figure 8:
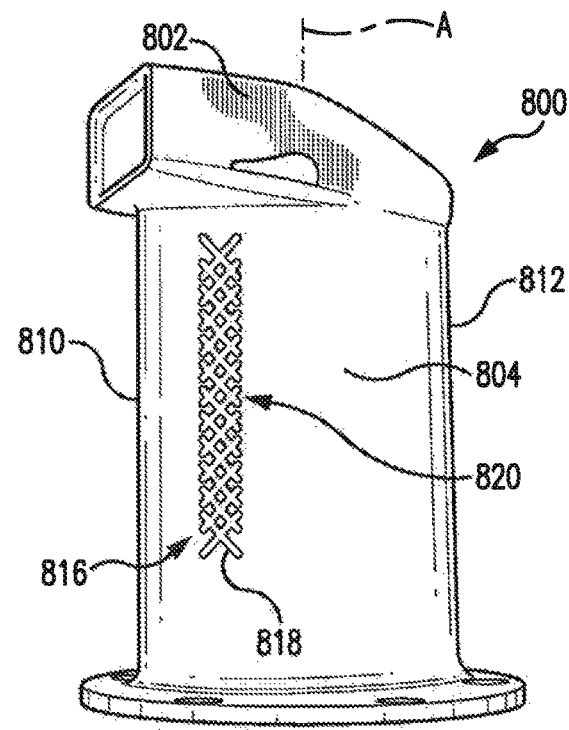
FIG. 8 is a perspective view of another exemplary embodiment of a total air temperature sensor constructed in accordance with the present disclosure, showing a turbulence inducing surface as a serrated surface, where the serrated surface includes overlapping linear serrations at opposing angles.

As shown in FIG. 8, total air temperature sensor 800 includes a turbulence inducing surface 816 defined in a strut 804 aft a leading edge 810. Turbulence inducing surface 816, e.g. serrated surface, includes a plurality of connecting serrations 818 at opposing angles, wherein serrations 818 have a generally constant geometry. Connecting serrations 818, similar to those in FIG. 6, define a strip of crosshatching 820. In FIG. 8, however, serrations 818 are larger than serrations 616. While turbulence inducing surface 816 is defined more proximate to the leading edge 810 than to a trailing edge 812, those skilled in the art will readily appreciate that turbulence inducing surface 816, can be moved and oriented as is suitable for a given application In addition, while turbulence inducing surface 816 is shown as having a depth with respect to strut 804, those skilled in the art will readily appreciate that turbulence inducing surface 816, including plurality of connecting serrations 818, can be raised with respect to strut 804.

Figure 9:
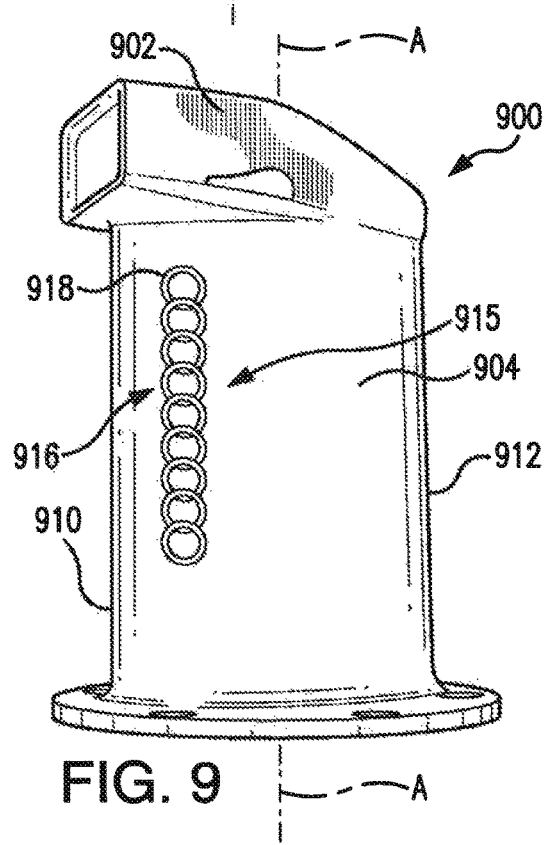
FIG. 9 is a perspective view of another exemplary embodiment of a total air temperature sensor constructed in accordance with the present disclosure, showing the turbulence inducing surface including a plurality of overlapping circular channels.

As shown in FIG. 9, total air temperature sensor 900 includes a turbulence inducing surface 916 defined in a strut 904 aft a leading edge 910. Turbulence inducing surface 916 includes a plurality of overlapping circular channels 918. Turbulence inducing surface is defined more proximate to the leading edge 910 than to a trailing edge 912. While turbulence inducing surface 916 is defined more proximate to the leading edge 910 than to a trailing edge 912, those skilled in the art will readily appreciate that turbulence inducing surface 916, can be moved and oriented as is suitable for a given application.

Those skilled in the art will readily appreciate that the quantity and arrangement of circular channels 918, as with all of the various turbulence inducing features described herein, can vary as is suitable for a given application. In addition, while turbulence inducing surface 916 is shown as having a depth with respect to strut 904, those skilled in the art will readily appreciate that turbulence inducing surface 916, including plurality of overlapping circular channels 918, can be raised with respect to strut 904.

Figure 10:
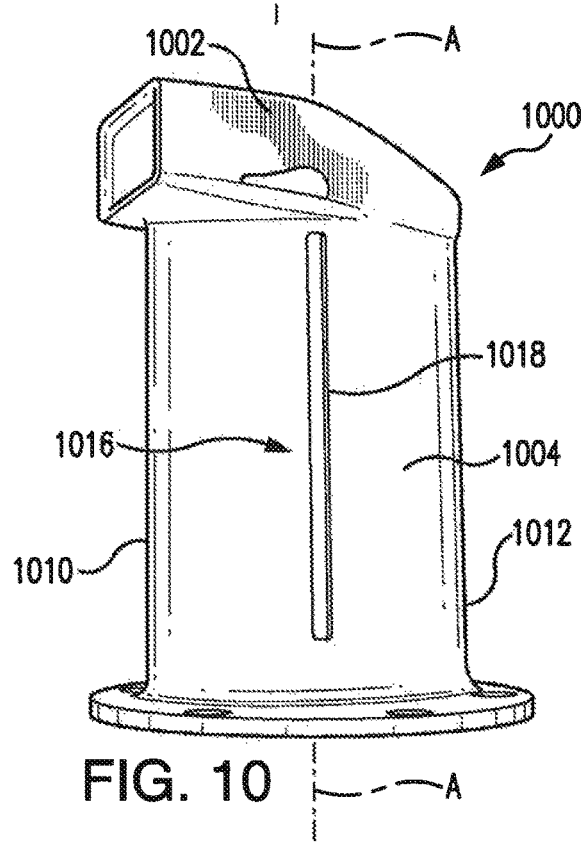
FIG. 10 is a perspective view of another exemplary embodiment of a total air temperature sensor constructed in accordance with the present disclosure, showing the turbulence inducing surface including a linear channel.

As shown in FIG. 10, total air temperature sensor 1000 includes a turbulence inducing surface 1016 defined in a strut 1004 aft a leading edge 1010. Turbulence inducing surface 1016 includes a linear channel 1018. While turbulence inducing surface 1016 is defined more proximate to the leading edge 1010 than to a trailing edge 1012, those skilled in the art will readily appreciate that turbulence inducing surface 1016, can be moved and oriented as is suitable for a given application. While serrated surface 1016 is shown in FIG. 10 as a constant linear channel, those skilled in the art will readily appreciate that there could be multiple linear channels as part of the same turbulence inducing surface 1016, e.g. there could be a first linear channel, a space, then a second linear channel aligned with the first. In addition, while turbulence inducing surface 1016 is shown as having a depth with respect to strut 1004, those skilled in the art will readily appreciate that turbulence inducing surface 1016, including linear channel 1018, can be raised with respect to strut 1004, for example, linear channel 1018 can be raised in a manner similar to linear flange 218.

Those having skill in the art will also readily appreciate that some of the turbulence inducing surfaces 116, 316, 416, 516, 616, 716, 816, 916 and 1016 can be manufactured in a secondary machining process in which a ball end-mill tool or laser etching is used to produce the turbulence inducing surface features, e.g. serrations 118, along the strut, e.g. strut 104. Those having skill in the art will also readily appreciate that a turbulence inducing surface, e.g. turbulence inducing surface 216, that includes a flange, e.g. flange 218, can be added to the strut, e.g. strut 204, by brazing, or welding. Or, if strut is manufactured by casting, flange can be included in the mold and no secondary process to add flange would be required.

Although turbulence inducing surface is shown and described above as including various arrangements of serrations 118, 318, 418, 618, and 818, dimples 718, flanges 218, circular channels 918, and/or linear channels 518 and 1018, those having skill in the art will readily appreciate that any suitable combinations or variations of these types of turbulence inducing surfaces, or any other suitable type of turbulence inducing surface can be used without departing from the spirit and scope of the invention. Further, those skilled in the art will readily appreciate that the serrations 118, 318, 418, 618, and 818, dimples 718, flanges 218, circular channels 918, and/or linear channels 518 and 1018, described above, can be scaled to be larger or smaller as needed without departing from the spirit and scope of the invention.

In addition, those skilled in the art will also readily appreciate that the serrations 118, 318, 418, 618, and 818, dimples 718, flanges 218, circular channels 918, and/or linear channels 518 and 1018, described above, can have various depths and/or heights with respect to the surface of their respective struts. For example, in certain embodiments, it is contemplated that, if raised, a maximum height of serrations 118, 318, 418, 618, and 818, dimples 718, flanges 218, circular channels 918, and/or linear channels 518 and 1018 can be a minimum 0.004 inches (0.102 mm) above their respective strut surface. And, for example, in certain embodiments, it is contemplated that, a depth of serrations 118, 318, 418, 618, and 818, dimples 718, flanges 218, circular channels 918, and/or linear channels 518 and 1018, with respect to a surface of their respective struts, can be between 0.004-0.010 inches (0.102-0.254 mm) deep.

The methods and systems of the present invention, as described above and shown in the drawings, provide total air temperature probes with superior properties including reducing acoustic noise emission. While the apparatus and methods of the subject invention have been shown and described with reference to certain embodiments, those skilled in the art will readily appreciate that changes and/or modifications may be made thereto without departing from the spirit and scope of the subject invention.

What is claimed is:

1. A total air temperature sensor comprising:
   a probe head having an airflow inlet and an airflow outlet;
   a strut defining a leading edge and an opposed trailing edge extending along a longitudinal axis, the strut connecting between the probe head and an opposed probe mount; and
   a turbulence inducing surface defined in the strut aft the leading edge configured to trip a fluid boundary layer passing over the strut to transition from laminar to turbulent to reduce acoustic noise emission from the total air temperature sensor wherein the turbulence inducing surface comprises a series of features spaced apart from one another
   wherein the series of features is defined along an outer surface of the strut in an axial direction with respect to the longitudinal axis of the strut.

2. The total air temperature sensor as recited in claim 1, wherein the turbulence inducing surface includes a portion defined in a first surface of the strut and a portion defined in a second surface of the strut, the second surface opposed to the first surface.

3. The total air temperature sensor as recited in claim 2, wherein the portion of the turbulence inducing surface defined in the first surface is defined along an axial direction with respect to the longitudinal axis of the strut, and the portion of the turbulence inducing surface defined in the second surface comprises a series of features spaced apart from one another, wherein the second series opposes the first series.

4. The total air temperature sensor as recited in claim 1, wherein the turbulence inducing surface is defined more proximate to the leading edge than to the trailing edge.

5. The total air temperature sensor as recited in claim 1, wherein the turbulence inducing surface is configured to reduce Kármán vortex interaction.

6. The total air temperature sensor as recited in claim 1, wherein the turbulence inducing surface comprises a feature selected from the group consisting of a plurality of a plurality of linear channels, a plurality of linear flanges, and a plurality of dimples.

7. The total air temperature sensor as recited in claim 1, wherein the series of features is free from perforations.

* * * * *